US012754765B2

(12) United States Patent
De Ridder et al.

(10) Patent No.: US 12,754,765 B2
(45) Date of Patent: Oct. 6, 2026

(54) STATEFUL ARTIFICIAL INTELLIGENCE (AI) RUNTIME ENVIRONMENT FOR ISOLATED STATEFUL EXECUTION OF AL AGENT WORKFLOWS

(71) Applicant: INK Content, Inc., Houston, TX (US)

(72) Inventors: Alexander De Ridder, Houston, TX (US); Alaa-eddine Kaddouri, Paris (FR)

(73) Assignee: INK Content, Inc., Houston, TX (US)

( * ) Notice: Subject to any disclaimer, the term of this patent is extended or adjusted under 35 U.S.C. 154(b) by 0 days.

(21) Appl. No.: 19/558,802

(22) Filed: Mar. 6, 2026

(65) Prior Publication Data

US 2026/0267689 A1 Sep. 10, 2026

Related U.S. Application Data

(60) Provisional application No. 63/767,949, filed on Mar. 6, 2025.

(51) Int. Cl.

*G06F 9/48* (2006.01)
*G06F 9/455* (2018.01)
*G06N 3/045* (2023.01)

(52) U.S. Cl.

CPC ............ *G06F 9/4881* (2013.01); *G06F 9/455* (2013.01); *G06N 3/045* (2023.01)

(58) Field of Classification Search

None

See application file for complete search history.

(56) References Cited

U.S. PATENT DOCUMENTS

| | | | | |
|---|---|---|---|---|
| 8,015,249 | B2 * | 9/2011 | Nayak | H04M 15/00 709/204 |
| 8,990,688 | B2 * | 3/2015 | Lee | H04M 1/72448 715/765 |
| 11,416,740 | B2 * | 8/2022 | Nokbak Nyembe | G06N 3/092 |
| 11,966,825 | B2 * | 4/2024 | Arcand | G06F 8/34 |
| 12,177,209 | B2 * | 12/2024 | Konduru | H04L 63/083 |
| 12,412,138 | B1 | 9/2025 | Geen et al. | |

OTHER PUBLICATIONS

Lewis, et al., Retrieval-Augmented Generation for Knowledge-Intensive NLP Tasks, arXiv:2005.11401, Apr. 12, 2021.
Park, et al., , "Generative Agents: Interactive Simulcra of Human Behavior," arXiv:2304.03442, Aug. 6, 2023.
Yao et al., "REACT: Synergizing Reasoning and Acting in Language Models," arXiv:2210.03629v3, Mar. 10, 2023.
Wang et al., "Voyager: An Open-Ended Embodied Agent with Large Language Models," arXiv:2305.16291.
Packer, et al. "MemGPT: Towards LLMs as Operating Systems," arXiv:2310.08560v2, Feb. 12, 2024.

* cited by examiner

*Primary Examiner* — Van H Nguyen
(74) *Attorney, Agent, or Firm* — David H. Judson

(57) ABSTRACT

The techniques herein provide for an AI agent-centric stateful runtime environment with integrated memory management and dynamic serializing and restoring of non-deterministic agent computational state across asynchronous execution boundaries. The approach herein overcomes the inherent statelessness and context-window limitations of Large Language Models (LLMs) when such models are utilized in agentic workflows.

20 Claims, 12 Drawing Sheets

STATEFUL ARTIFICIAL INTELLIGENCE (AI) RUNTIME ENVIRONMENT FOR ISOLATED STATEFUL EXECUTION OF AL AGENT WORKFLOWS

BACKGROUND

This disclosure relates generally to Artificial Intelligence (AI) agent-based systems and methods.

Agent architectures form the foundation of how artificial intelligence (AI) systems think and act. These frameworks define the inner workings of AI agents—the smart programs that can perceive their surroundings, make choices, and take steps to reach specific goals. Understanding agent architectures is key to grasping how modern AI operates and evolves.

Existing AI runtime environments have various technical limitations, namely, inefficient orchestration, limited context management, and inconsistent security. In particular, conventional solutions require monolithic processes or containers for each AI agent, wherein entire processes or containers for each agent are spun up by the operating system. This leads to suboptimal resource usage. Memory handling (e.g., Large Language Model (LLM) context windows) is often limited to the native capabilities of a single model or library, and thus there is no support for AI applications whose memory requirements may need to expand or contract outside of a single LLM's context window. Security typically is left to the Operating System (OS) and heterogeneous backends that have differing or no native security controls, making it difficult to provide fine-grained resource control at the "agent" level.

SUMMARY

The techniques herein address the above-described deficiencies and provide for an AI agent-centric stateful runtime environment with integrated memory management and dynamic serializing and restoring of non-deterministic agent computational state across asynchronous execution boundaries that overcomes the inherent statelessness and context-window limitations of Large Language Models (LLMs) when such models are utilized in agentic workflows.

The foregoing has outlined some of the more pertinent features of the disclosed subject matter. These features should be construed to be merely illustrative. Many other beneficial results can be attained by applying the disclosed subject matter in a different manner or by modifying the subject matter as will be described.

DETAILED DESCRIPTION

Figure 1:
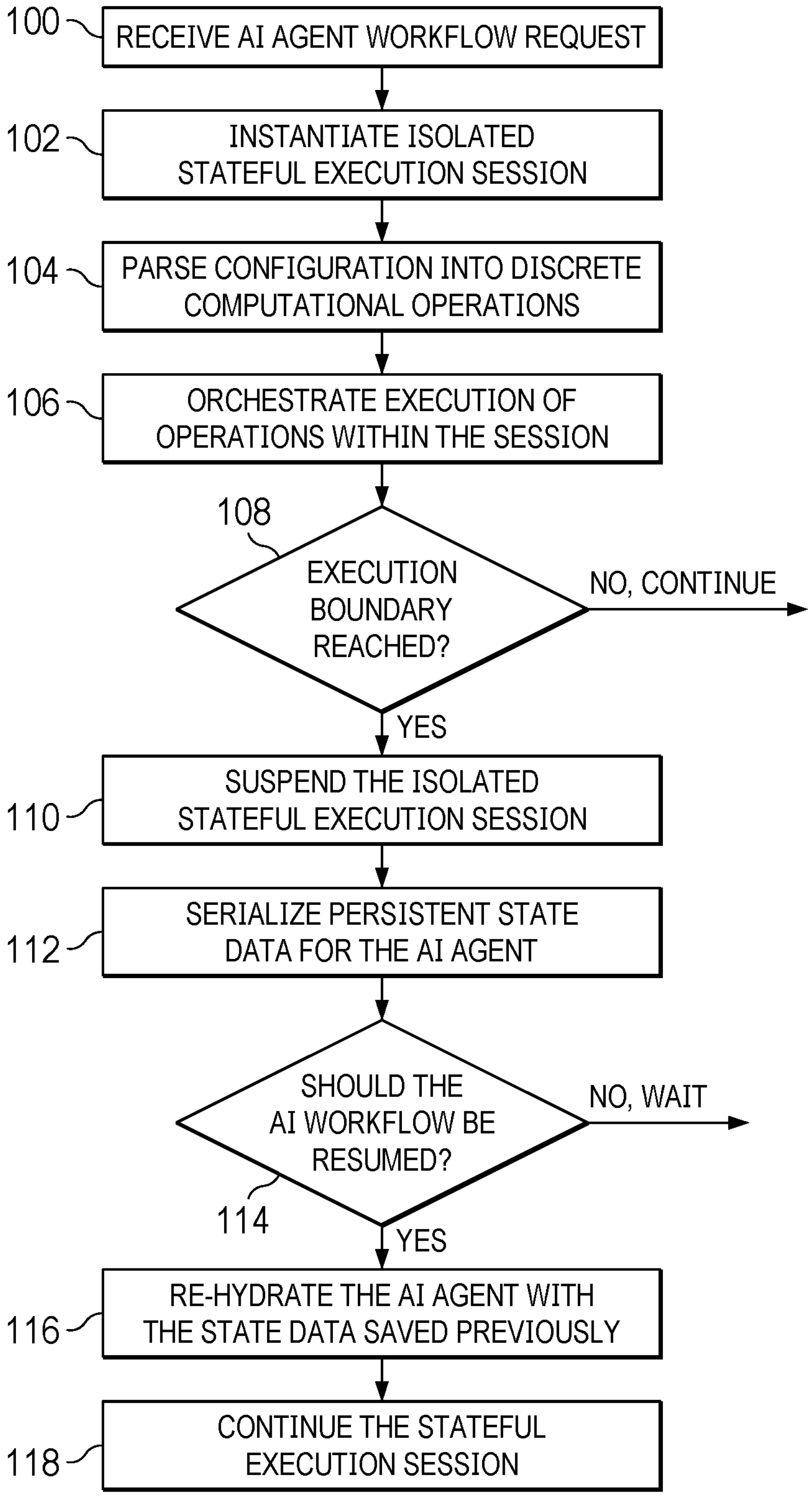
FIG. 1 depicts a representative a stateful, agentic orchestration system and method of this disclosure.

As used herein, an "AI agent" is a stateful, software-based entity or process, executing within a runtime environment, that (1) accepts inputs (structured or unstructured) from one or more data sources or user interfaces; (2) maintains an internal state (e.g., conversation context, operational parameters, or other memory structures) that persists between execution steps; (3) leverages at least one Machine-Learning (ML) component, such as an LLM or other neural-network-based module, to interpret the inputs, perform reasoning or transformations, and generate outputs; and (4) dynamically produces a result, command, or further data based on its internal state, learned model(s), or external triggers, often orchestrating multi-step or semi-autonomous workflows. Stated another way, an AI agent is a computational module (sometimes referred to herein as a "Contextual Orchestration Module (COM)") that operates event-driven or schedule-driven within the system, retains and updates context or "memory" about prior interactions, and interacts with external resources (e.g., storage, APIs, or other agents), preferably through defined interfaces, tools or connectors. As provided for herein, an AI agent may be instantiated, suspended, resumed, and/or terminated by a runtime environment, while maintaining references to its internal state and machine-learning model interfaces to accomplish tasks that go beyond a single, stateless request-response transaction.

"Agentic AI" is an AI system designed to accomplish some goal without supervision. This type of system comprises a set of AI agents, typically machine learning models, and each agent performs a specific subtask required to reach the goal. A large language model (LLM) typically acts as an orchestrator that understands tasks, generates solutions and coordinates the models for specific functions. By integrating with external tools and software via application programming interfaces, an agentic AI system can quickly execute tasks based on the plans it has formulated, and the system continuously improves by feeding data generated from its interactions back into the system to enhance the models. In an AI system of this type, agents follows a repeating cycle of perceiving, reasoning, acting, and learning to autonomously achieve their objectives. Given that multi-step agentic workflows are often long-running, the lifecycle of an AI agent (which includes design, development, testing, validation, deployment, continuous monitoring, and tuning) may be long-lived.

An AI agent (agentic) "workflow" is an autonomous, multi-step process where AI agents use reasoning, planning, and tools to accomplish complex tasks.

An agentic AI runtime environment (or "runtime environment") is a software framework (which itself may have hardware-level or other virtualization support such as hypervisor-based or containerized session isolation) that provides the necessary tools, infrastructure, and context for autonomous AI agents to operate, plan, and execute multi-step tasks independently over a multi-step agentic workflow. According to this disclosure, the agentic AI runtime environment is "stateful" in that it is configured with the built-in capability to remember context, data, and the history of previous AI agent interactions across different requests or execution steps. In particular, the stateful runtime environment maintains a persistent "memory" of ongoing processes or sessions, allowing subsequent operations to be aware of and dependent on prior actions.

To this end, FIG. 1 depicts a high level process flow of a stateful, agentic runtime environment of this disclosure. The stateful runtime environment is implemented as a software-based framework, a hypervisor-based or container-based framework, or a hardware-based framework, or some combination thereof. As depicted in the process flow, and in response to receipt of an AI agent workflow request at step 100, the runtime environment instantiates an isolated stateful execution session for the AI agent workflow. This is step 102. In this example, the AI agent workflow request typically has associated therewith configuration information for the workflow. In an example embodiment, the configuration information is provided as a set of semantic configuration data (e.g., a capability manifest that conforms to a Model Context Protocol (MCP), an Agent-to-Agent (A2A) schema, a symbolic definition file, or others). When parsed, the configuration information maps business rules, external tool interfaces and other necessary system or computational resources into a plurality of discrete computational operations that the fleet of AI agents then implement. At step 104, the semantic configuration is parsed into a plurality of discrete computational operations. At step 106, the stateful runtime environment orchestrates the execution of the plurality of discrete computational operations within the isolated stateful execution session established at step 102. At step 108, and during execution of the discrete computational operations, a test is performed to detect whether an execution boundary has been reached. An execution boundary is sometimes referred to as a checkpoint, and it is typically associated (or a characteristic) of a given AI agent. Upon a positive outcome of the test at step 108, the process flow branches to step 110 to suspend the isolated execution session for at least this particular AI agent. At step 112, the stateful runtime environment serializes persistent state data for the AI agent, preferably to a memory manager as will be described below. A test is then performed at step 114 to determine whether the AI agent workflow (with the AI agent) should be resumed. If the outcome at the test at step 114 is positive, the stateful runtime environment subsequently resumes the AI agent workflow (and the AI agent) by dynamically rehydrating the isolated stateful execution session (and the AI agent), at least in part using the serialized persistent state data that was previously saved to the memory manager in step 112. This re-hydration of the AI agent is step 116. The isolated stateful execution session is continued at step 118 to complete the process flow. In this manner, the stateful runtime environment operates to dynamically serialize and re-hydrate non-deterministic computational state across asynchronous execution boundaries. When implemented in an operating environment wherein AI agents interoperate with Large Language Models (LLMs), this operation overcomes the inherent statelessness and context-window limitations of the LLMs.

While FIG. 1 describes operations 108 through 116 of the stateful runtime environment with respect to a single AI agent, it should be appreciated that similar operations typically are being carried out for one or more other agents operating in the AI agent workflow and with respect to their associated execution boundaries. Further, the notion of the isolated stateful execution session should be broadly-construed to cover any session for the agent workflow, whether short-lived, long-lived, purpose-driven, or under some other temporal or operational constraint.

As used herein, the notion of "re-hydrating" typically involves restoring an AI agent's working memory, planning steps, tool execution progress, and the like, from the saved snapshot (the state data) that has been serialized to working memory (a database, a file, or other data structure) so that the agent can then resume some task (e.g., of a multi-step task sequence) where it left off.

Figure 2:
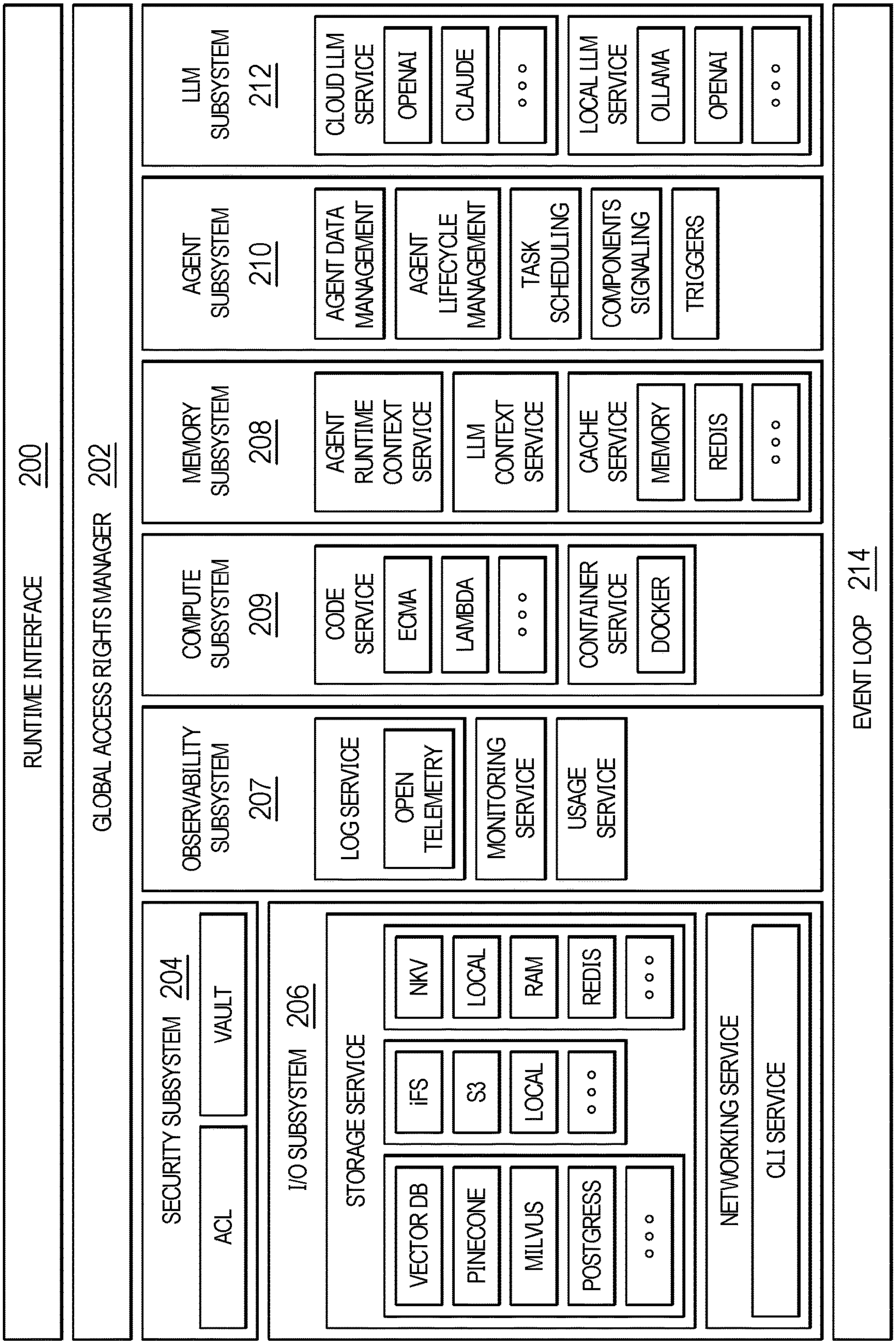
FIG. 2 depicts an example embodiment of a software-based runtime execution environment.

As noted, the above-described stateful runtime execution may be implemented in different types of execution environments, from purely software-based frameworks, virtualization-based frameworks, hardware-supported execution frameworks, and combinations thereof. Generalizing, the stateful runtime execution itself provides for infrastructure-agnostic orchestration layer, and there is no limitation on the particular manner in which the runtime itself is actually implemented. That said, the following describes an example embodiment involving a software-based runtime Software-based runtime execution environment FIG. 2 depicts an overall block diagram of a representative system architecture with a software layer-based runtime execution environment, which is designed specifically for managing and orchestrating AI agent execution within an isolated stateful execution session in the manner described above in the process flow of FIG. 1. As noted above, this is just one representative example of an implementation of a stateful runtime execution environment in which isolated stateful execution sessions are supported according to the techniques of this disclosure, but this example is not intended to be limiting.

In particular, FIG. 2 depicts a high-level block diagram illustrating a runtime interface 200 to a system that comprises a Global Access Rights Manager (GARM) 202 and various subsystems, namely, Security Subsystem 204, I/O Subsystem 206, Observability Subsystem 207, Compute Subsystem 209, Memory Subsystem 208 (which includes the memory manager), Agent Subsytsm 210, and LLM Subsystem 212. In this example embodiment, these subsystems interconnect using event loop 214, e.g., based Node.js. Node.js is a cross-platform, open-source JavaScript runtime environment that can run on Windows, Linux, Unix, macOS, and more. Node.js runs on the V8 JavaScript engine, and executes JavaScript code outside a web browser. Node.js has an event-driven architecture capable of asynchronous I/O.

Figure 3:
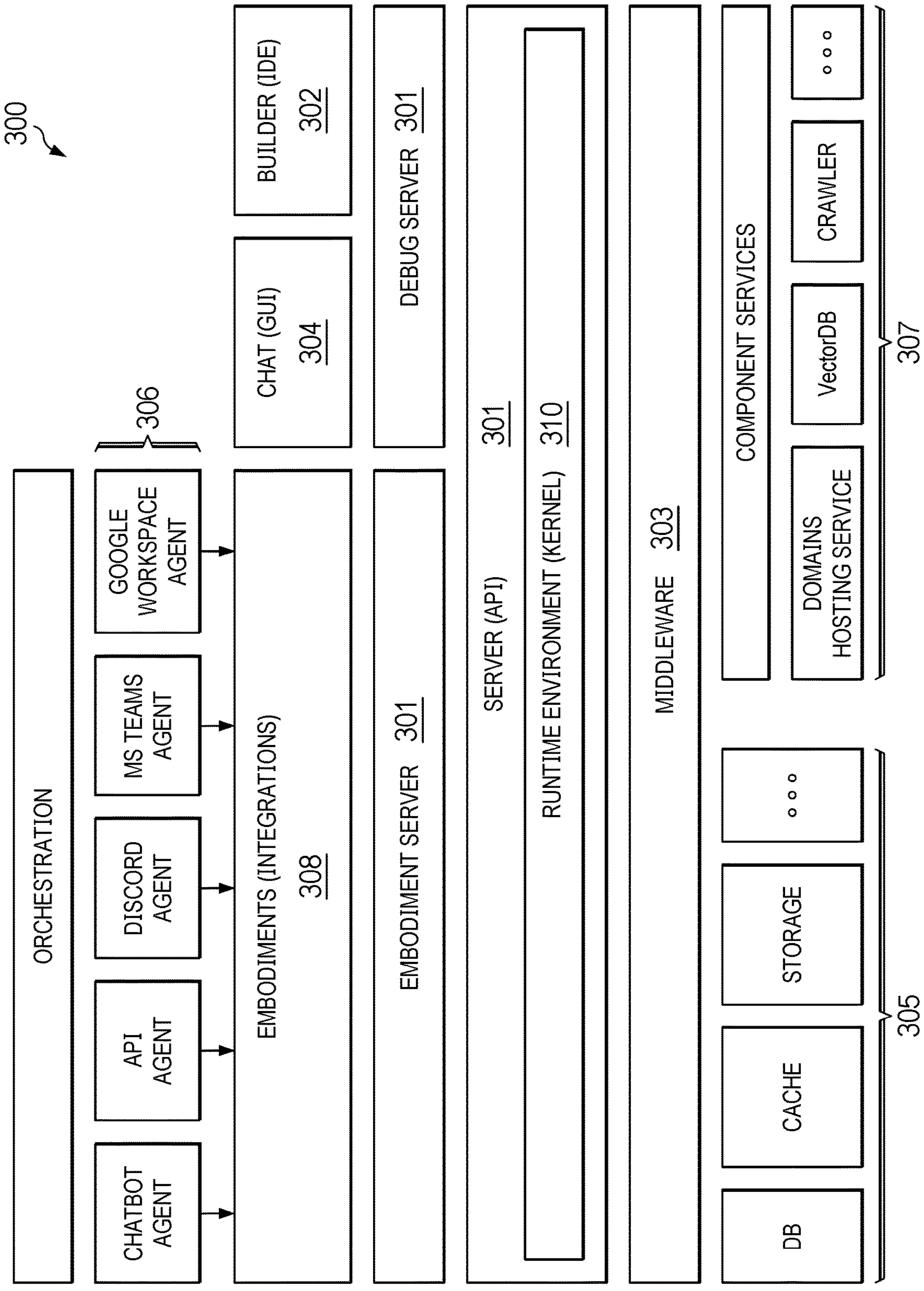
FIG. 3 depicts a high level view of the software architecture of the system shown in FIG. 2.

The solution in this embodiment provides an execution environment consistent with the process flow in FIG. 1 that manages memory, networking, and orchestration for AI agents. Depending on implementation, in this embodiment the agents are typically deployed in one of three (3) options: local, agent cloud, or enterprise. In each case, agents are run by the runtime environment, which then uses different drivers depending on the environment. In a representative implementation, a public-facing Software-as-a-Service (SaaS) is used to build, debug, manage and work with AI agents, and the underlying runtime environment depicted in FIG. 2 "runs" the agents created in the SaaS. A representative software architecture 300 for this purpose is depicted in FIG. 3 and includes one or more servers 301, middleware 303, a storage layer 305, and a component services layer 307, and the depicted software components handle all necessary abstractions and provides programmatic interfaces IDE 302 and GUI 304 to run the agents 306. The runtime environment 310 that is described herein is depicted at 310. The software architecture also provides an interface for external integrations, which are depicted as the "Embodiments" 308.

Figure 4:
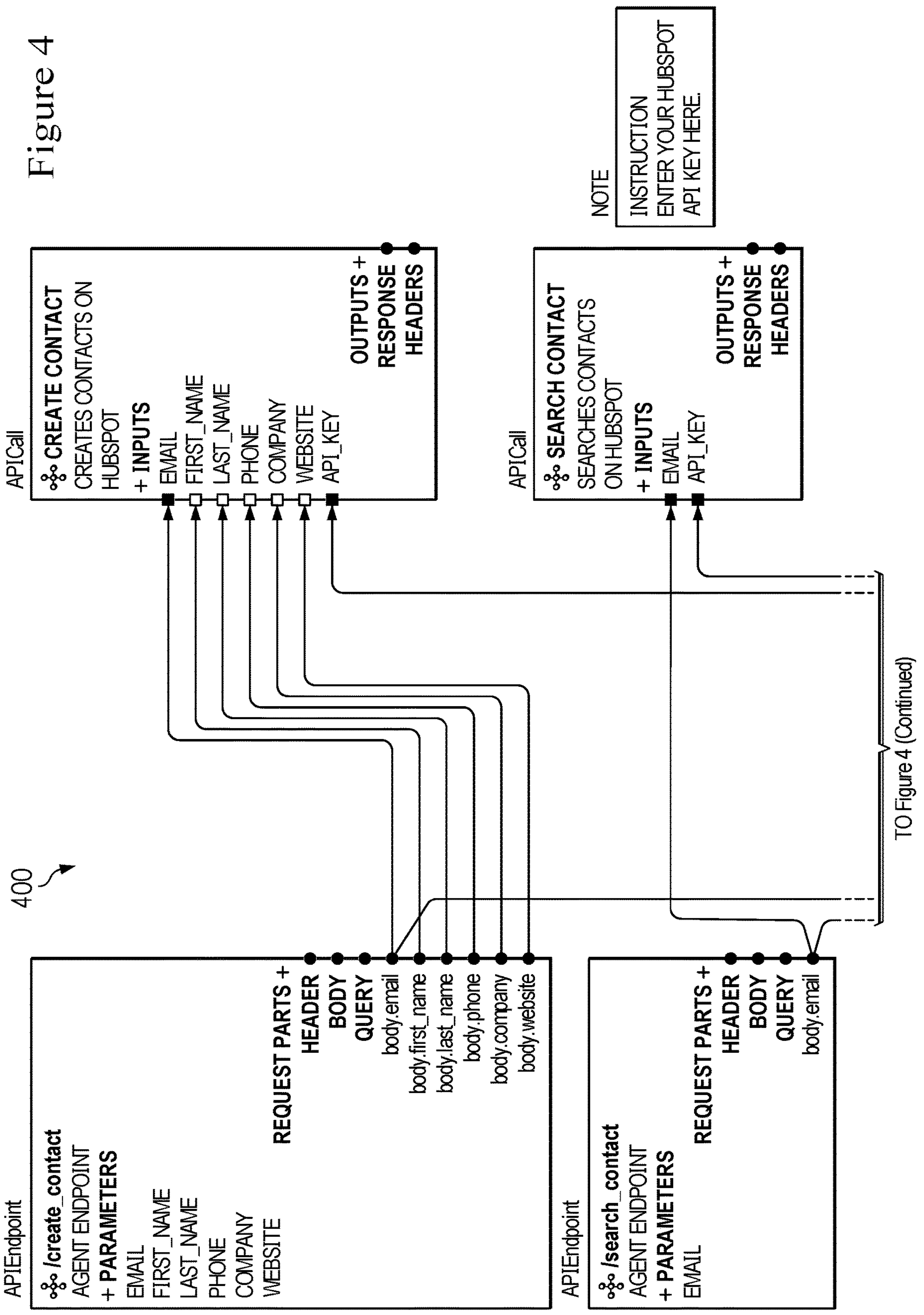
FIG. 4 depicts a sample symbolic description that the example software-based runtime environment compiles or transforms into discrete components, which components are then scheduled and executed in an event-driven manner.
Figure 4:
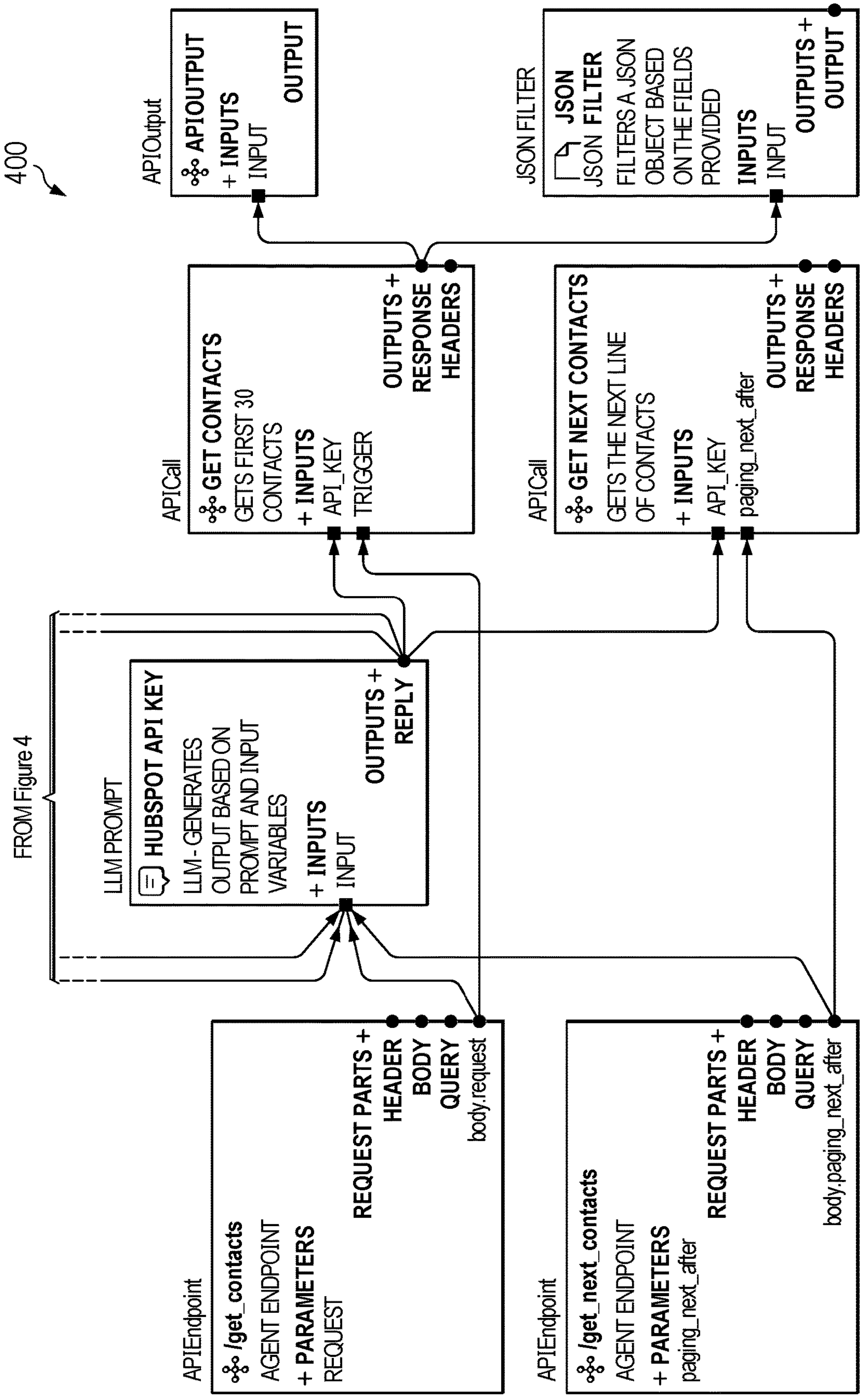

FIG. 4 depicts a sample symbolic description 400 that the runtime environment of this embodiment compiles or transforms into discrete components, which components are then scheduled and executed in an event-driven manner. This symbolic description is representative of a semantic configuration as described above in the context of the process flow in FIG. 1. In particular, and in this example embodiment agents are written in a high-level file format describing tasks, LLM prompts, and tool/API calls. This example description is provided for exemplary purposes only.

Figure 5:
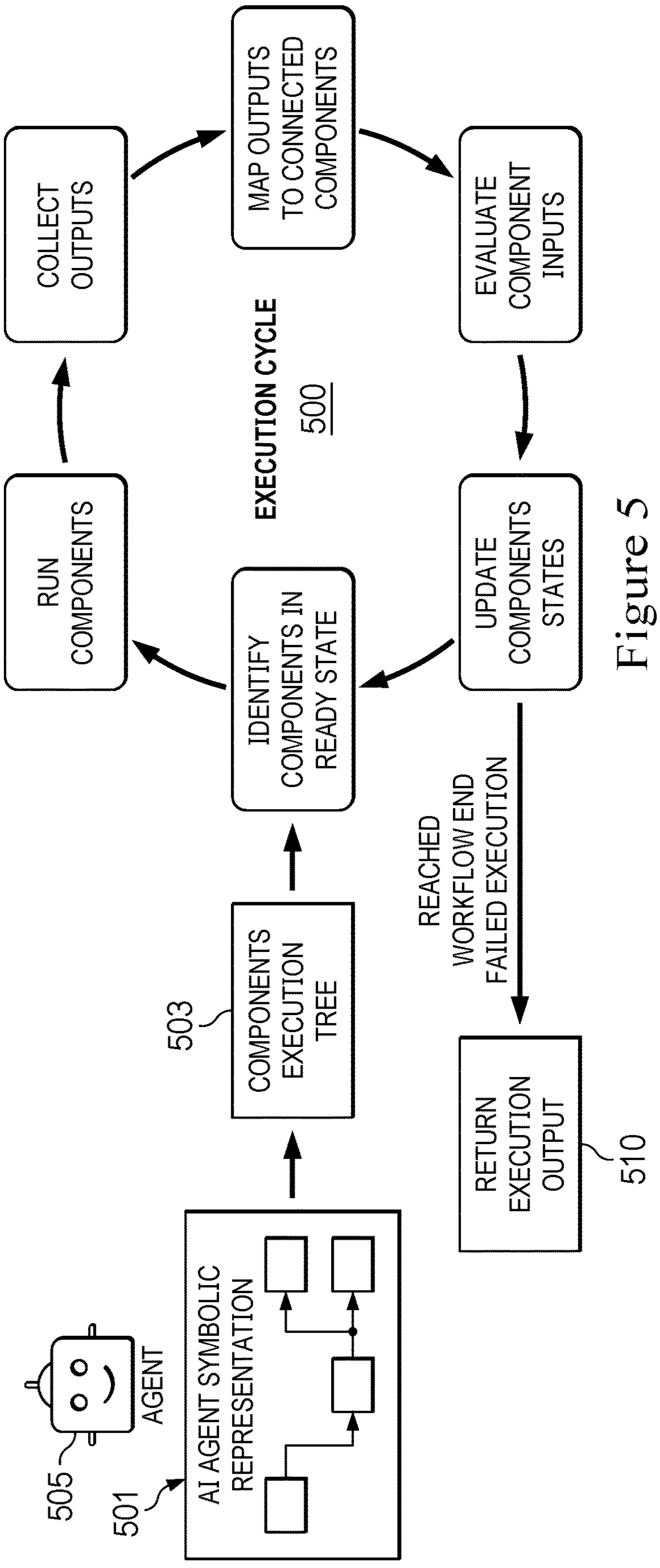
FIG. 5 depicts how in the example software-based runtime symbolic agent definitions are compiled into components, then scheduled in an event-driven loop, and then executed by the runtime environment.
Figure 6:
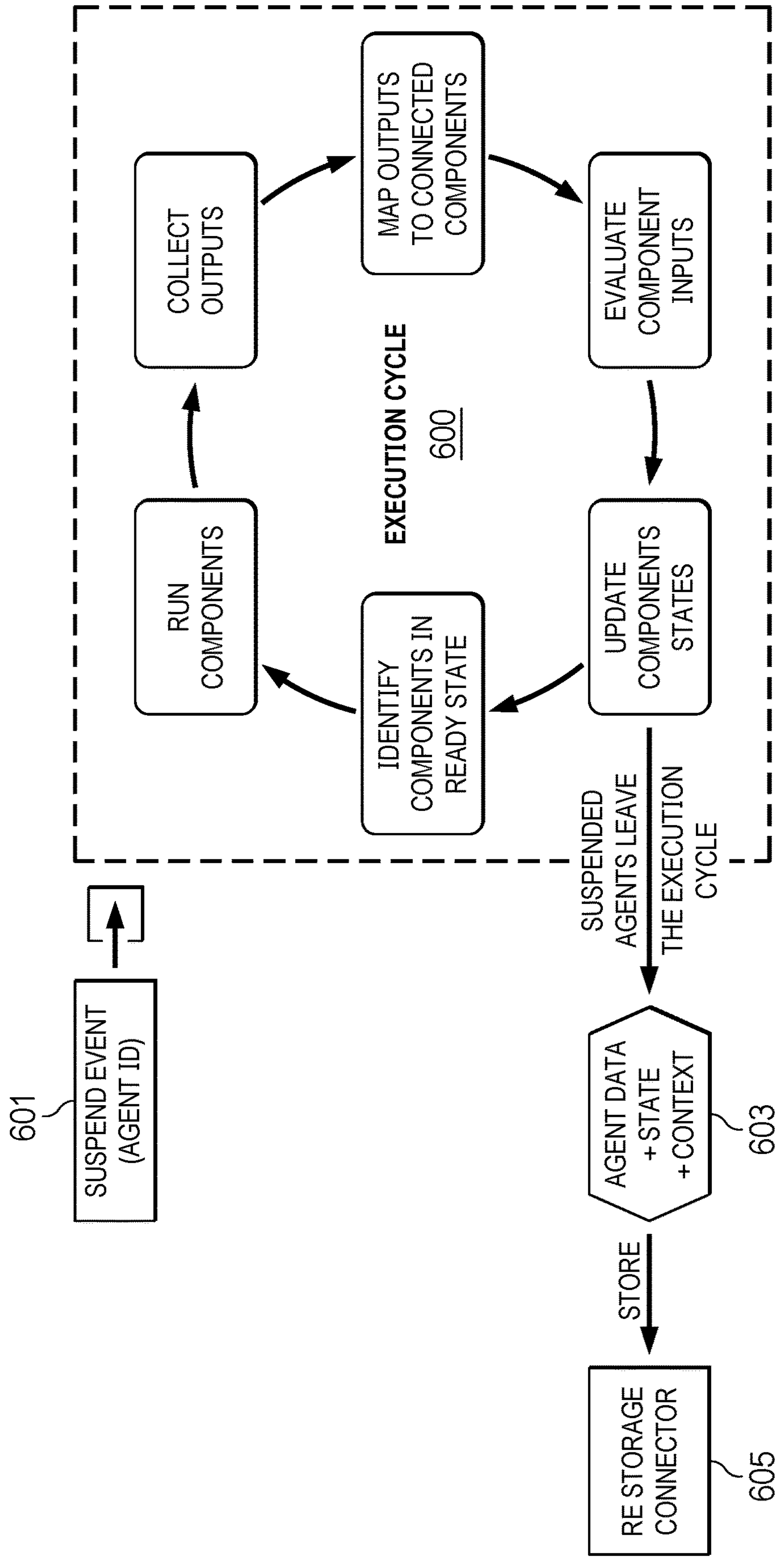
FIG. 6 depicts an AI agent suspension by the runtime environment.

FIG. 5 depicts a flowchart showing how the symbolic agent definitions (e.g., as depicted in FIG. 4 as an example file) are compiled into components (a compile phase), then scheduled in an event-driven loop (an execution phase). In this example, and in the compile phase, the AI agent symbolic representation 501 for the agent 505 is compiled into a components execution tree 503, and the submitted to the execution cycle, shown at reference numeral 500 as including a set of operations (moving clockwise): identify components in ready state, run components, collect outputs, map outputs to connected components, evaluate component inputs, update component states. When the workflow ends (or execution fails), an execution output 510 of the execution cycle 500 is output. As depicted, and in this example embodiment, and not by way of limitation, the runtime environment Execution Cycle 500 is common to all running agents in the system. In operation, the system does not wait for an agent to be fully executed before running the next agent; instead any agent that has components ready enters the execution cycle. Once compiled, and in the example software-based embodiment, components are executed under Node.js's event loop, enabling concurrency and partial updating. This design differs from typical AI solutions, which treat an entire agent as a single (typically Python-based) process or container. In the subject approach, each component boundary is a "checkpoint" where the runtime environment can pause the agent. At this time, state is stored in memory or an external store, freeing CPU/GPU resources. When resuming, the runtime execution environment rebuilds only the needed subsystem contexts, allowing the agent's workflow to continue seamlessly. This is a specific implementation for this embodiment of the dynamic serialization and re-hydration of non-computational state across the checkpoint execution boundary as previously described in the context of FIG. 1. FIG. 6 in particular depicts this serialization operation, once again for the example embodiment. In particular, in FIG. 6, the suspended agent leaves the execution cycle 600 as a result of receipt of a suspend event 601. The agent data, state and context are serialized at 603, with that state then saved to a data store 605. As previously described, the agent can later re-join the execution cycle (the stateful execution session) by having the runtime re-hydrate this persisted state data.

As noted above, is not required that the semantic configuration data for the AI agent workflow be limited to a symbolic representation, although in this software-based example embodiment, this is one preferred implementation. Generalizing, the configuration information for the AI workflow (also sometimes referred to herein as the "semantic layer") may be generated in the following manner. Using an interface (e.g., a Command Line Interface (CLI), a Graphical User Interface (GUI), an Application Programming Interface (API) or the like), a request to package an agentic workflow is received. In response, a visual representation of the agentic workflow (such as depicted in FIG. 4, by way of example only) is extracted into a programmatic configuration file. The programmatic configuration file is then executed, e.g., via a software abstraction layer (e.g., that unifies SDK and CLI abstraction layers) comprising pluggable connectors for Large Language Models, vector databases, storage systems and other data and resources, to generate a set of compiled, deployable programmatic artifacts. These artifacts, coupled with the unified connector layer, provides a specific, concrete toolchain for the AI developer workflow, thus facilitating its implementation in the applicable runtime execution environment. This developer tooling (i.e., the visual agent-to-code workflow) also improves developer efficiency and cross-environment CI/CD deployment.

More generally, the semantic configuration for the AI agent workflow and that is translated into runtime execution steps for the AI agent may comprise any appropriate machine-based format, such as a decentralized capability manifest conforming to the Model Context Protocol (MCP), an Agent-to-Agent (A2A) schema, or the like. Thus, any decentralized semantic layer that provides the appropriate context (including rules, tool interfaces, etc.) for the AI agents may be utilized. This notion is sometimes also referred to herein as semantic tool routing.

Returning back to the example software-based embodiment, the agent runtime environment of this embodiment provides for adaptive agent scheduling and resource management. This feature involves several aspects: component-based execution, degraded mode operation, and suspend/resume/partial examination. The latter operation was depicted in FIG. 6, which shows how an agent's state at the execution boundary can be snapshotted (serialized) to memory or disk, allowing resources to be reclaimed, and wherein when the agent is later triggered the system rebuilds only the necessary context( ) for the previously-suspended agent (re-hydration). Component-based execution is the notion also described above wherein the runtime execution environment breaks an agent's flow into small, independently-executable units for the stateful execution session. The units can be run in parallel, time-sliced, or selectively degraded, e.g., if certain drivers are missing. As an example of this degraded-mode operation, assume a particular caching driver is unavailable. The runtime recognizes this, but still executes the agent's other components, thereby returning partial results or reduced functionality. This design also ensures high fault tolerance and plug-and-play driver architecture support.

Figure 7:
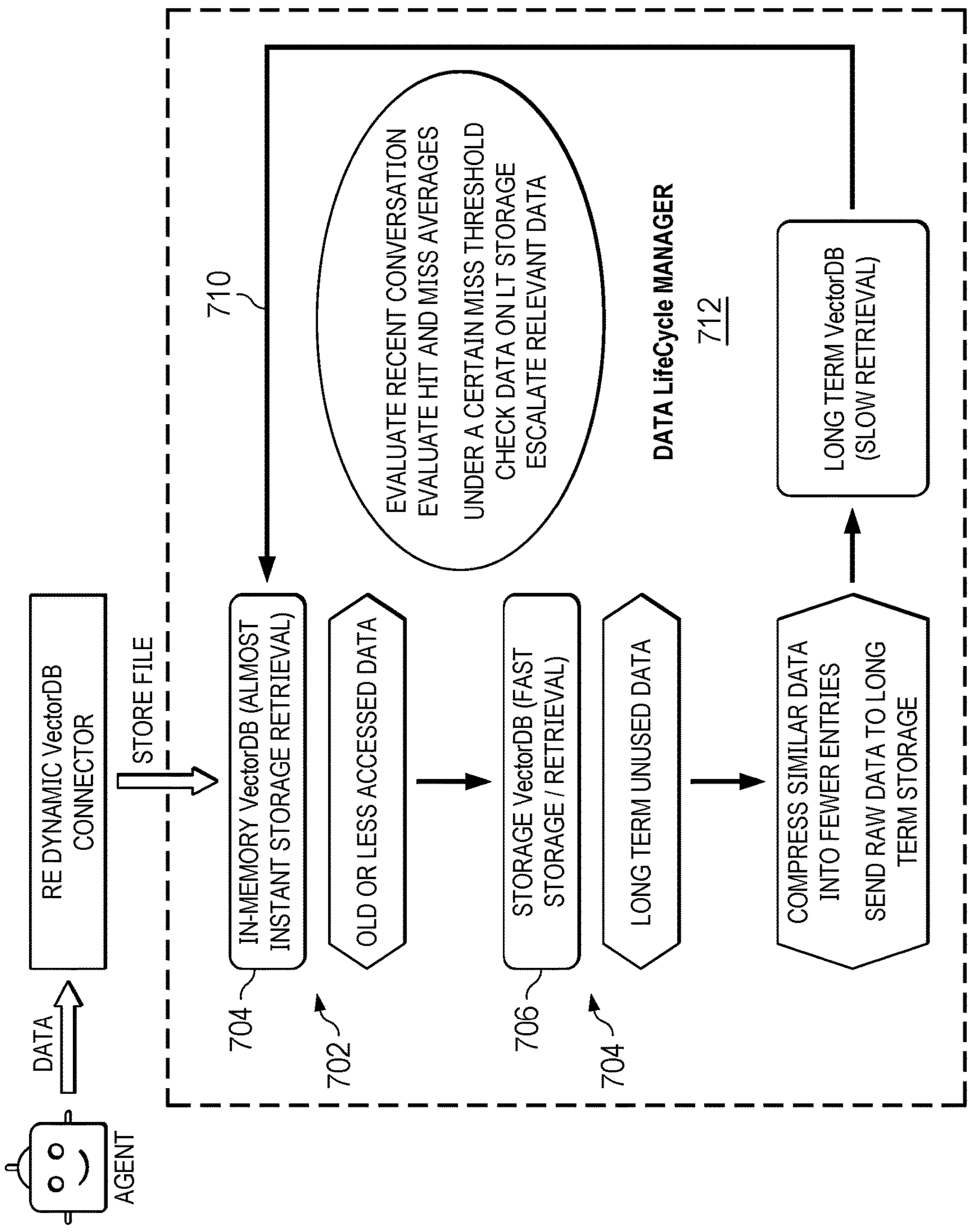
FIG. 7 depicts a representative layered memory and dynamic embedding swap technique provided by the example software-based runtime environment of this disclosure.

FIG. 7 depicts a layered memory and dynamic embedding swap feature of the runtime environment in this embodiment. According to this aspect, the stateful runtime execution environment provides for an abstract context window, multi-tier embeddings, and implementation of custom forget/remember policies. Continuing with this example, the abstract context window works as follows: the stateful runtime intercepts the input to an LLM, injecting or removing conversation details, and one or more agents override or bypass an LLM's native context limit by chunking conversation history and retrieving relevant information, preferably on demand. In a particular example, multi-tier embeddings leverage a fast in-memory vector store (e.g., based on Redis+Embeddings) for immediate recall, and a slower but larger preferably cloud-based vector database (DB) for older or less-frequently accessing information. Real-time embedding swap logic is then used to decide whether to store/retrieve data from short- or long-term memory, as the case may be. Custom memory policies are defined by the memory manager that, for example, defines custom heuristics such as "Keep customer profile data for 24 hours, but purge chat logs after 5 days." FIG. 7 depicts representative memory management functions, namely, short-term 702 vs. long-term 704 memory layers, the use of multiple vector databases (slow 706 versus fast 708), and the dynamic injection 710 of data into an LLM's context window. As also shown, a Data LifeCycle Manager 712 preferably is implemented as a standalone process independent from agent events. It continuously updates the data and moves it across the different storage (and/or memory) levels to maintain a balance between access performance and storage capacity.

Another aspect of the runtime environment of this example embodiment is the provision of a security model that provides unified security and resource access. This aspect incorporates several features: metadata-based security tokens, agent identity and Access Control List (ACL), and a Global Access Rights Manager (GARM), which is depicted as reference numeral 202 in FIG. 2. In particular, the stateful runtime execution environment preferably attaches a token (e.g., an encoded string or ACL marker) to each resource (file, DB row, data object, LLM, etc.). The token indicates who (or which agent roles) can access the resource. Further, an agent within the runtime preferably also has an "identify" or capability set. When a resource request occurs, the runtime reads the resource's embedded security token and checks it against the agent's identity. This system works even if the underlying storage does not natively support secure access. In this example embodiment, GARM implements a central policy engine that hooks into the Node.js event loop; it standardizes security checks across all drivers (storage, LLM calls, memory). The security model is designed to guarantee a robust resources access security across multiple providers. It is independent of the underlying data provider, but it benefits from built-in security systems.

Generalizing, the security models preferably rely on several concepts: ACL Object—this object is attached to the resource that needs to be secured (e.g. local file, S3 Object, Memory cache, LLM execution . . . etc.); Access Candidate—this object holds the candidate unique id and its role, such as Team, User, Agent, and Public; and Access Request—an access request is generated by the runtime when a candidate wants to access a resource, and it is composed of a resource id and an access candidate. Moreover, preferably every connector access requires a certain security privilege. For example, an agent that retrieves data from a vectorDB, then calls an LLM, then stores the result on S3 needs to have three access (3) privileges, namely, VectorDB read access, LLM model read access, Amazon® S3 Storage write access. Further, preferably the runtime also handles Access hierarchy. A resource that is written by an agent is by design inaccessible to any other agent, but typically it is accessible by the agent team because an agent belongs to a team.

In this example software-based example embodiment, the runtime environment preferably supports a number of security levels from the most to least permissive. The applied security level depends on an execution factor representing a desired system hardening, and enterprise policy. A very high security level is not always the best choice, thus the runtime is configured to give flexibility to handle different levels. For example, the following is a list of security levels illustrated by the ACL Object format: Level 0 (no security)—all data is clear; Level 1—ACL entries are hashed, which guarantees that a privileged admin who has access to the data provider can see the data but cannot know who has access to what; Level 2—ACL Object is serialized, and preferably this is the default level in the runtime; and Level 3—ACL Object is Encrypted, wherein a dedicated team level key-pair is used to encrypt/decrypt the ACL. In this level, even an admin who has direct access to the resource cannot extract any information about the access level; a super admin who has access to the data provider can still retrieve the resource but cannot know to whom it belongs. A still higher level, Level 4—both ACL and the resource are encrypted with the key-pair, giving maximum level of security. At this level even a super-admin with all access rights to the data provider cannot access to the data.

Figure 8:
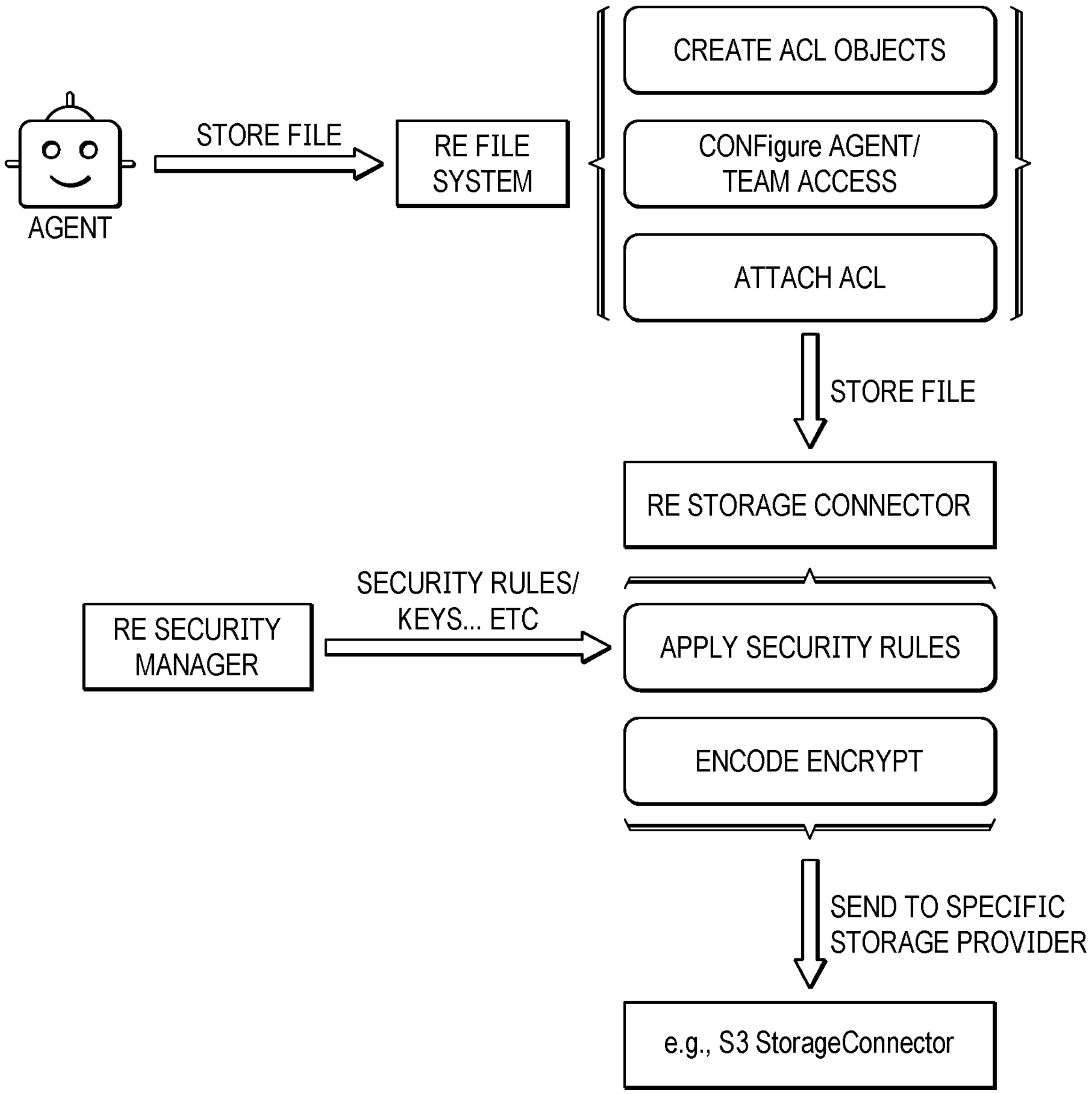
FIG. 8 depicts an AI agent storing a file.
Figure 9:
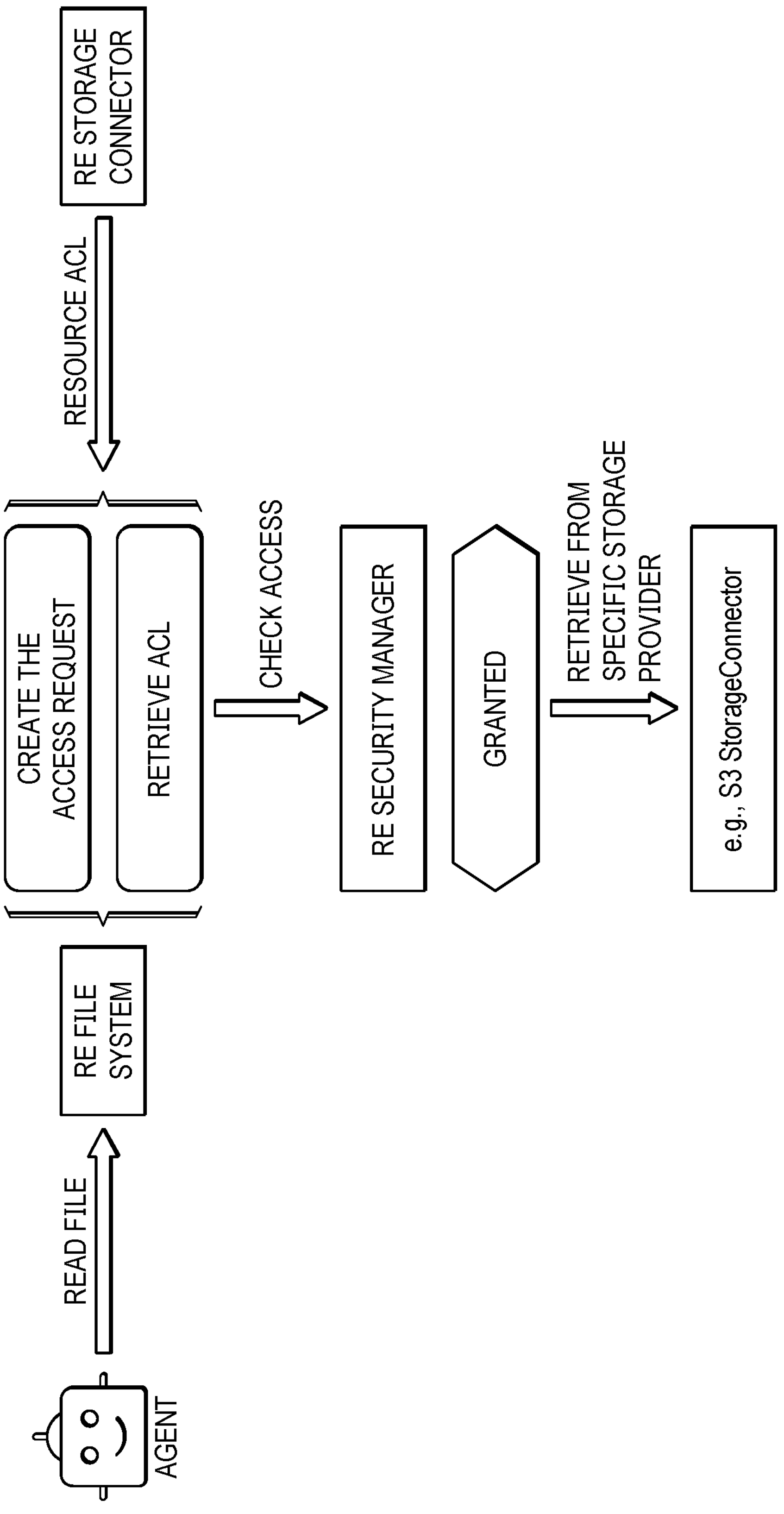
FIG. 9 depicts an AI agent requesting a file.

The security model described above is depicted in the resource storage/access diagrams depicted in FIG. 8 (an AI agent storing a file) and in FIG. 9 (an AI agent requesting a file). These are merely representative examples.

The security model described above for the software-based runtime execution environment embodiment is not intended to be limiting. Stated another way, it is not required that a custom metadata-based security token affixed to files approach be used. In an alternative embodiment, the system implements a security model that dynamically maps an internal access candidate object corresponding uniquely to the AI agent workflow to an external, platform-native identity infrastructure. In this variant, and for example, the security model enforces execution boundaries based on an inherited role assumption policy provided by the platform-native identity infrastructure. Generalizing, by leveraging the above-described approach that leverages the platform-native identity infrastructure, the AI agents integrate seamlessly with their existing enterprise security posture intact and without requiring implementation of the token-based solution.

Figure 10:
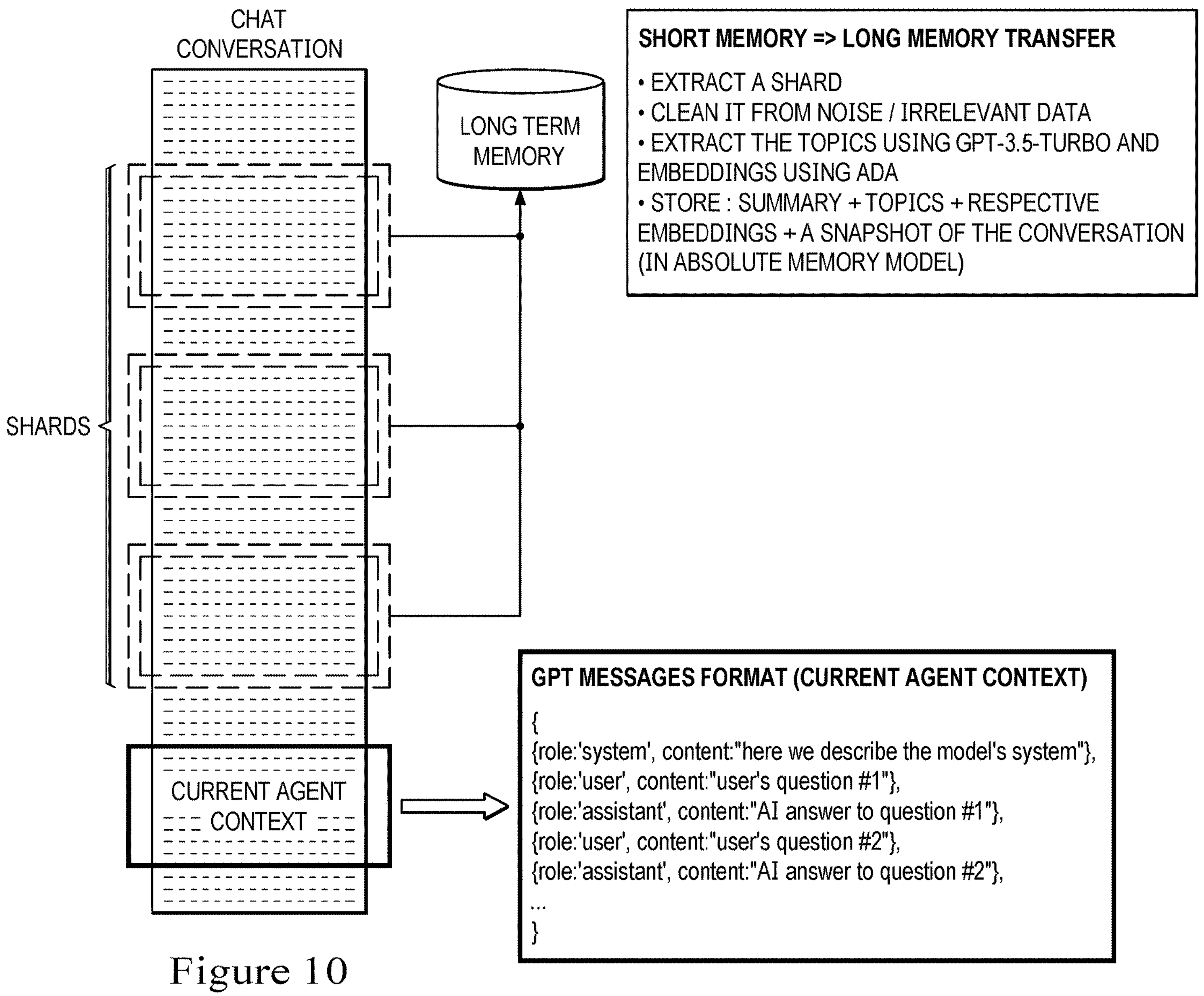
FIG. 10 depicts further details of the memory management operations.
Figure 11:
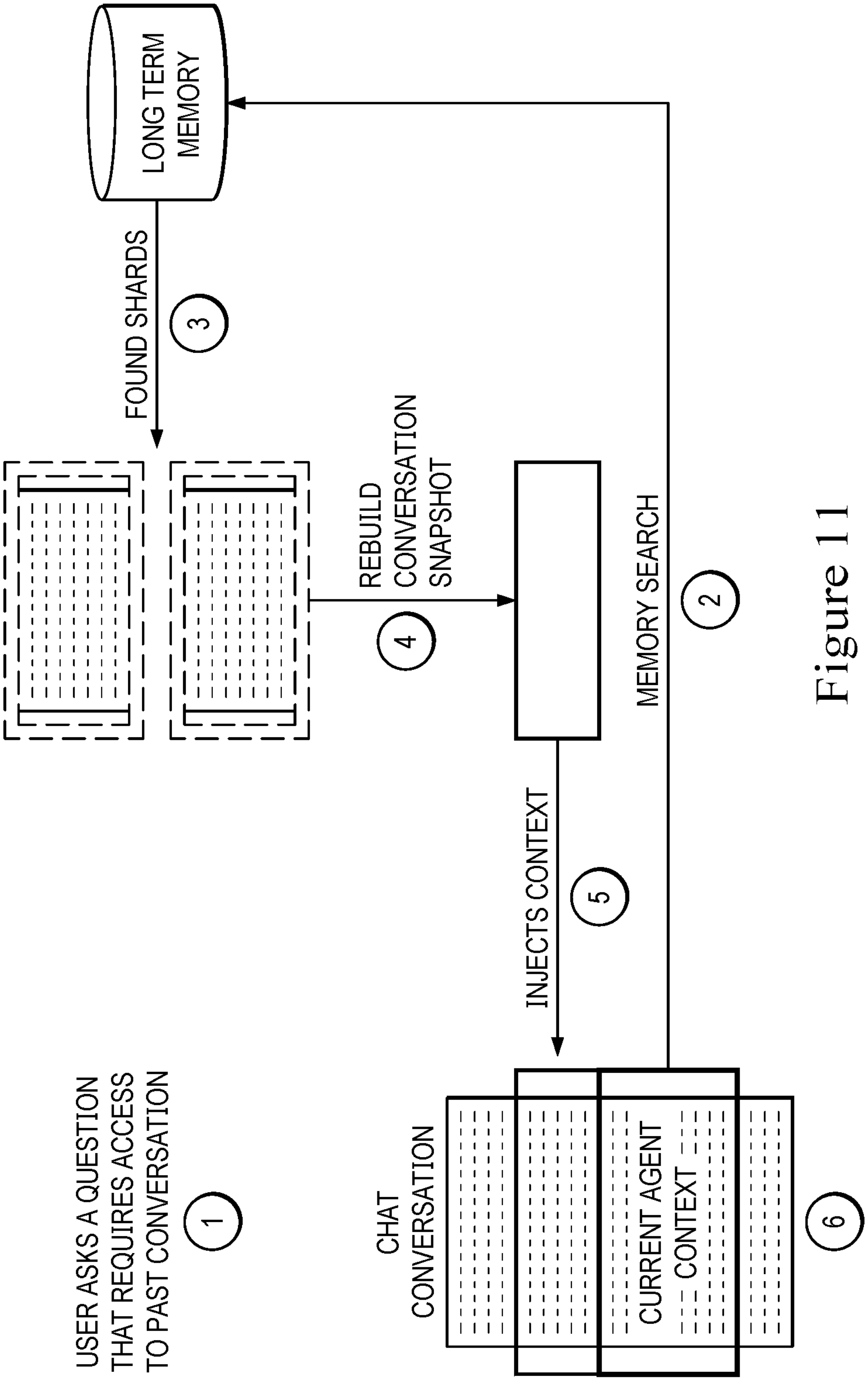
FIG. 11 depicts how the memory manager provides dynamic memory management.

The following describes an example implementation flow of the software-based stateful runtime execution environment. In operation, the runtime is first initialized. Preferably, the runtime boots with an optional configuration file specifying which drivers (LLM, storage, memory) to load. Each driver registers with a central registry, allowing the system to "discover" available components. Assume now that a user makes a request for an agent, e.g., a "Sales Support Agent." In response, and in this isolated stateful execution session, the runtime loads the agent's symbolic definition, compiles it, and kicks off the first component. Upon initiating the execution cycle, the runtime provides a memory injection function, which checks if the user's history is in short-term or long-term storage. Relevant data is brought into the LLM's context. The agent's conversation logic runs, generating a partial output. As depicted in FIG. 10, the runtime preferably splits the context window into two parts, one that contains the latest conversation messages, and another that is used to "remember" older conversations. As the conversation slides in the context window, the runtime captures shards of the conversation, generate keywords and embeddings, then stores the result in a Vector Database. The notion of remembering an old conversation is depicted in FIG. 11, and it involves continuously evaluating the user conversation, retrieving relevant data, converting it to LLM conversation format, and then injecting it back to the context window. This technique makes the LLM believe that the information was always there.

Returning to the execution flow for the stateful isolated execution session, assume now that the agent attempts to pull product pricing information from an S3 bucket. The applicable security mechanism intercepts the request, reads the bucket's security token, and confirms the agent role is authorized. Later, e.g., midway through the conversation, assume now that the user is inactive; at this point, and as explained above, the runtime suspends the agent to free CPU/GPU resources. This is an example of the suspension operation. Upon receiving a new user message, the runtime resumes from the saved stated, continuing seamlessly. This is an example of the re-hydration operation Summarizing the above example workflow for this non-limiting example embodiment, when an agent submits a task, the runtime sees a symbolic workflow, breaks it into event-driven components, and orchestrates them in the concurrency loop. When a component needs conversation context, the layered memory logic checks short-term versus long-term stores, and re-injects relevant shards on demand. If a component tries to store or retrieve a file, the runtime verifies the ACL object in the Security Manager, and enforces the correct encryption or denies access if not permitted. As new data arrives (or old data is no longer used), a dynamic vector DB connector promotes/demotes shards behind the scenes, thereby keeping the agent's "view" consistent while optimizing performance. If the system is busy or the agent needs to wait for user input, the runtime can pause the agent at a component (execution) boundary. Later, the agent picks up exactly where it left off.

The AI agent runtime environment example embodiment provides significant advantages. It provides a truly agent-centric operating environment via symbolic compilation, layered memory, and security tokens. By combining these subsystems through an event-driven concurrency model, this example runtime uniquely addresses the evolving needs of AI workflows, from advanced memory and security requirements to seamless scaling and driver-based extensibility. The described solution provides for fine-grained, component-level scheduling that avoids the overhead of launching multiple OS processes per agent. Further, the inclusion of symbolic definitions as the semantic layer in this example embodiment allow partial updates and simplified maintenance compared to large codebases. The advanced memory management techniques (extended/customizable memory) simulate near-unlimited conversation memory and advanced "forget" policies, enabling more human-like or domain-specific knowledge retention. The security mechanism ensures agent-specific ACL without relying on platform-level permissions. In multi-tenant scenarios, this also allows for and enforcement of strict partitioning of agent data usage. The above-described operations are readily implemented in a small binary with embedded Node.js runtime that runs on any modern OS as well as on resource-constrained devices (e.g., edge computing, NPUs, or the like). It provides for a minimal, universal runtime (~50 MB, and with no external dependencies) that executes AI "agents" on any operating system or device (e.g., Linux, Windows, macOS, Raspberry Pi). It is thus platform-agnostic but specialized for agentic AI. The runtime environment also supports and extensible "driver" model for new language models, data source and security subsystems. It provides for efficient memory management, an event-driven architecture (e.g., Node.js loops), and a robust plug-and-play approach. The runtime environment is realized for small-footprint distribution and deployments, and specialized security, caching and Input/Output (I/O) pipelines are tailored for agent workflows.

The system herein (e.g., when operated "as-a-service") may leverage other components, such as an agent that builds other agents visually. A user can type a request (or drop an image/workflow diagram), and the agent automatically generates a multi-step workflow, hooking up the right language models, prompts, APIs, and data sources.

As noted above, the software-based runtime execution environment depicted and described is not intended to be limiting. It is just a representative example of the more generalized approach herein involving stateful runtime execution of agentic AI workflows that leverages state serialization (typically per-agent) across execution boundaries, semantic tool routing, memory management, and unified infrastructure tooling.

Enabling Technologies

Aspects of this disclosure may be practiced, typically in software, on one or more machines or computing devices. More generally, the techniques described herein are provided using a set of one or more computing-related entities (systems, machines, processes, programs, libraries, functions, or the like) that together facilitate or provide the described functionality described above. In a typical implementation, a representative machine on which the software executes comprises commodity hardware, an operating system, an application runtime environment, and a set of applications or processes and associated data, which provide the functionality of a given system or subsystem. As described, the functionality may be implemented in a standalone machine, or across a distributed set of machines. A computing device connects to the publicly-routable Internet, an intranet, a private network, or any combination thereof, depending on the desired implementation environment.

One implementation may be a computing platform. One or more functions of the computing platform may be implemented in a cloud-based architecture. The platform may comprise co-located hardware and software resources, or resources that are physically, logically, virtually and/or geographically distinct. Communication networks used to communicate to and from the platform services may be packet-based, non-packet based, and secure or non-secure, or some combination thereof.

As described above, the techniques herein may be practiced via a Software-as-a-Service (SaaS) that is used to build, debug, manage and work with AI agents, and wherein the underlying RE "runs" the agents created in the SaaS. Preferably, the service is accessible over the publicly-routed Internet at a particular domain, or sub-domain. The platform is a securely-connected infrastructure (typically via SSL/TLS connections), and that infrastructure includes data encrypted at rest, e.g., in an encrypted database, and in transit. The computing platform typically comprises a set of applications implemented as network-accessible services. One or more applications (services) may be combined with one another. An application (service) may be implemented using a set of computing resources that are co-located or themselves distributed. Typically, an application is implemented using one or more computing systems. The computing platform (or portions thereof) may be implemented in a dedicated environment, in an on-premises manner, as a cloud-based architecture, or some hybrid. Although typically the platform is network-accessible, e.g., via the publicly-routed Internet, the computing system may be implemented in a standalone or on-premises manner. In addition, one or more of the identified components may interoperate with some other enterprise computing system or application. One or more components of the above-described solution may run on bare-metal, on a Virtual Machine (VM), in a container, as a Kubernetes deployment, and the like.

Generalizing, one or more functions of the computing platform of this disclosure may be implemented in a cloud-based architecture. As is well-known, cloud computing is a model of service delivery for enabling on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. Available services models that may be leveraged in whole or in part include: Software as a Service (SaaS) (the provider's applications running on cloud infrastructure); Platform as a service (PaaS) (the customer deploys applications that may be created using provider tools onto the cloud infrastructure); Infrastructure as a Service (IaaS) (customer provisions its own processing, storage, networks and other computing resources and can deploy and run operating systems and applications).

The platform may comprise co-located hardware and software resources, or resources that are physically, logically, virtually and/or geographically distinct. Communication networks used to communicate to and from the platform services may be packet-based, non-packet based, and secure or non-secure, or some combination thereof.

More generally, the techniques described herein are provided using a set of one or more computing-related entities (systems, machines, processes, programs, libraries, functions, or the like) that together facilitate or provide the described functionality described above. In a typical implementation, a representative machine on which the software executes comprises commodity hardware, an operating system, an application runtime environment, and a set of applications or processes and associated data, which provide the functionality of a given system or subsystem. As described, the functionality may be implemented in a standalone machine, or across a distributed set of machines.

Each above-described process or process step/operation preferably is implemented in computer software as a set of program instructions executable in one or more processors, as a special-purpose machine.

Representative machines on which the subject matter herein is provided may be hardware processor-based computers running an operating system and one or more applications to carry out the described functionality. One or more of the processes described above are implemented as computer programs, namely, as a set of computer instructions, for performing the functionality described. Virtual machines may also be utilized.

While the above describes a particular order of operations performed by certain embodiments of the invention, it should be understood that such order is exemplary, as alternative embodiments may perform the operations in a different order, combine certain operations, overlap certain operations, or the like. References in the specification to a given embodiment indicate that the embodiment described may include a particular feature, structure, or characteristic, but every embodiment may not necessarily include the particular feature, structure, or characteristic.

While the disclosed subject matter has been described in the context of a method or process, the subject matter also relates to apparatus for performing the operations herein. This apparatus may be a particular machine that is specially constructed for the required purposes, or it may comprise a computer otherwise selectively activated or reconfigured by a computer program stored in the computer. Such a computer program may be stored in a non-transitory computer readable storage medium, such as, but is not limited to, any type of disk including an optical disk, a CD-ROM, and a magnetic-optical disk, a read-only memory (ROM), a random access memory (RAM), a magnetic or optical card, or any type of media suitable for storing electronic instructions, and each coupled to a computer system bus.

There is no limitation on the type of computing entity that may implement a function or operation as described herein.

While given components of the system have been described separately, one of ordinary skill will appreciate that some of the functions may be combined or shared in given instructions, program sequences, code portions, and the like. Any application or functionality described herein may be implemented as native code, by providing hooks into another application, by facilitating use of the mechanism as a plug-in, by linking to the mechanism, and the like.

The functionality may be co-located or various parts/components may be separately and run as distinct functions, and in one or more locations over a distributed network.

Computing entities herein may be independent from one another, or associated with one another. Multiple computing entities may be associated with a single enterprise entity, but are separate and distinct from one another.

Generative artificial intelligence is artificial intelligence capable of generating text, images, or other media in response to prompts. Generative AI models learn the patterns and structure of their input training data by applying neural network machine learning techniques, and then generate new data that has similar characteristics. A large language model (LLM) is a language model generative AI characterized by emergent properties enabled by its large size. A typical LLM is built with artificial neural networks that are pre-trained using self-supervised learning and semi-supervised learning, and a model of this type may have tens of millions to billions of weights. As language models, a model of this type works by taking an input text and repeatedly predicting a next token or word. Known generative LLMs (GLLMs) include OpenAI GPT-4, LLaMA, and many others.

What is claimed follows below.

The invention claimed is:

1. A method implemented in a computing system having a runtime execution environment, the runtime execution environment configured to provide stateful agentic orchestration of a set of Artificial Intelligence (AI) agents by:

responsive to receipt of a request associated with an AI agent workflow, wherein the request is associated with a configuration, instantiating an isolated stateful execution session;

parsing the configuration into a set of one or more discrete computational operations for a set of AI agents;

orchestrating execution of the set of one or more discrete computational operations within the isolated stateful execution session;

during the execution of the set of or more discrete computational operations, detecting whether an execution boundary associated with a given AI agent has been reached;

upon determining that the execution boundary associated with the given AI agent has been reached, suspending the isolated stateful execution session;

serializing to a memory state data associated with the given AI agent;

thereafter, determining whether to resume the isolated stateful execution session with the given AI agent;

upon a determination to resume the isolated stateful execution session, re-hydrating the given AI agent, at least in part using the state data that was previously serialized to the memory; and resuming the isolated stateful execution session;

wherein the given AI agent accepts structured or unstructured inputs, maintains an internal state, is associated with a Machine Learning (ML) model, and produces one or more outputs based at least in part on interactions with the ML model, the ML model having a context window, and wherein, during the execution of a given discrete computational operation, a prompt intended for the ML model is intercepted and selectively augmented to include given data that is outside the context window.

2. The method as described in claim 1, wherein the configuration is a set of semantic configuration data that conforms to one of: a given format, a schema, and a symbolic representation.

3. The method as described in claim 2, wherein the semantic configuration data is derived from a visual representation of AI agent interactions.

4. The method as described in claim 2, wherein parsing the configuration maps contextual information associated with the computing system into the one or more discrete computational operations.

5. The method as described in claim 1, wherein the runtime execution environment is software-based.

6. The method as described in claim 5, wherein the software-based runtime execution environment is a single event loop.

7. The method as described in claim 1, wherein the runtime execution environment is virtualization- or container-based.

8. The method as described in claim 1, wherein the runtime execution environment is at least in part hardware-based.

9. The method as described in claim 1, wherein the ML model is a Large Language Model (LLM).

10. The method as described in claim 1, wherein the context window is a conversational context window having a time period associated with a conversation, and wherein the method further includes sharding a conversation history associated with the given AI agent into a first portion that includes data representing an active language model context, and a second portion that includes the given data.

11. The method as described in claim 10, wherein the first portion of the conversation history is stored in-memory, and the second portion is stored in a data store.

12. The method as described in claim 11, further including adjusting contents of the first portion and the second portion based on a data usage metric.

13. The method as described in claim 12, wherein adjusting the contents of the first portion and the second portion includes, with respect to the time period, placing newly-received data associated with a conversation in the first portion and migrating older or less-used data from the first portion to the second portion.

14. The method as described in claim 1, further including applying a security policy to a resource associated with the AI agent workflow.

15. The method as described in claim 14, wherein the security policy is defined by a security token with the resource.

16. The method as described in claim 14, wherein the security policy is defined in a platform-native identity infrastructure.

17. An apparatus, comprising:

a hardware processor; and computing memory holding computer program instructions executed by the hardware processor, the computer program instructions configured as a runtime execution environment, the runtime execution environment configured to provide stateful agentic orchestration of a set of Artificial Intelligence (AI) agents by:

responsive to receipt of a request associated with an AI agent workflow, wherein the request is associated with a configuration, instantiating an isolated stateful execution session;

parsing the configuration into a set of one or more discrete computational operations for a set of AI agents;

orchestrating execution of the set of one or more discrete computational operations within the isolated stateful execution session;

during the execution of the set of or more discrete computational operations, detecting whether an execution boundary associated with a given AI agent has been reached;

upon determining that the execution boundary associated with the given AI agent has been reached, suspending the isolated stateful execution session;

serializing to a memory state data associated with the given AI agent;

thereafter, determining whether to resume the isolated stateful execution session with the given AI agent;

upon a determination to resume the isolated stateful execution session, re-hydrating the given AI agent, at least in part using the state data that was previously serialized to the memory; and resuming the isolated stateful execution session;

wherein the given AI agent accepts structured or unstructured inputs, maintains an internal state, is associated with a Machine Learning (ML) model, and produces one or more outputs based at least in part on interactions with the ML model, the ML model having a context window, and wherein, during the execution of a given discrete computational operation, a prompt intended for the ML model is intercepted and selectively augmented to include given data that is outside the context window.

18. The apparatus as described in claim 17, wherein the context window is a conversational context window having a time period associated with a conversation.

19. A computer program product in a non-transitory computer-readable medium comprising computer program code executable in a hardware processor, the computer program code configured as a runtime execution environment, the runtime execution environment configured to provide stateful agentic orchestration of a set of Artificial Intelligence (AI) agents by:

responsive to receipt of a request associated with an AI agent workflow, wherein the request is associated with a configuration, instantiating an isolated stateful execution session;

parsing the configuration into a set of one or more discrete computational operations for a set of AI agents;

orchestrating execution of the set of one or more discrete computational operations within the isolated stateful execution session;

during the execution of the set of or more discrete computational operations, detecting whether an execution boundary associated with a given AI agent has been reached;

upon determining that the execution boundary associated with the given AI agent has been reached, suspending the isolated stateful execution session;

serializing to a memory state data associated with the given AI agent;

thereafter, determining whether to resume the isolated stateful execution session with the given AI agent;

upon a determination to resume the isolated stateful execution session, re-hydrating the given AI agent, at least in part using the state data that was previously serialized to the memory; and resuming the isolated stateful execution session;

wherein the given AI agent accepts structured or unstructured inputs, maintains an internal state, is associated with a Machine Learning (ML) model, and produces one or more outputs based at least in part on interactions with the ML model, the ML model having a context window, and wherein, during the execution of a given discrete computational operation, a prompt intended for the ML model is intercepted and selectively augmented to include given data that is outside the context window.

20. The computer program product as described in claim 19, wherein the context window is a conversational context window having a time period associated with a conversation.

* * * * *